(12) United States Patent
Bichler et al.

(10) Patent No.: US 8,417,406 B2
(45) Date of Patent: Apr. 9, 2013

(54) METHOD FOR THE EARLY INDUCTION OF AN ADDITIONAL START OF AN INTERNAL COMBUSTION ENGINE IN A VEHICLE WITH A HYBRID DRIVE

(75) Inventors: Franz Bichler, Munich (DE); Matthias Herger, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 13/106,630

(22) Filed: May 12, 2011

(65) Prior Publication Data

US 2011/0213523 A1    Sep. 1, 2011

Related U.S. Application Data

(63) Continuation of application No. PCT/EP2009/007487, filed on Oct. 20, 2009.

(30) Foreign Application Priority Data

Nov. 13, 2008    (DE) .......................... 10 2008 056 972

(51) Int. Cl.
*B60L 9/00*    (2006.01)
*B60L 11/00*    (2006.01)

(52) U.S. Cl. .................... 701/22; 180/65.21; 180/65.28; 180/65.285; 290/40 C; 903/930

(58) Field of Classification Search .................... 701/22; 180/65.28, 65.21, 65.285, 95.285; 903/930; 290/40 C See application file for complete search history.

(56) References Cited

U.S. PATENT DOCUMENTS

| | | | |
|---|---|---|---|
| 6,000,376 A | 12/1999 | Hess et al. | |
| 6,384,490 B1 * | 5/2002 | Birzl et al. | 307/10.3 |
| 6,441,506 B2 * | 8/2002 | Nakashima | 290/40 C |
| 6,553,287 B1 * | 4/2003 | Supina et al. | 701/22 |

(Continued)

FOREIGN PATENT DOCUMENTS

| | | |
|---|---|---|
| DE | 44 22 636 A1 | 1/1996 |
| DE | 196 18 893 A1 | 11/1997 |

(Continued)

OTHER PUBLICATIONS

Wen Xuhui; Zhao Feng; Guo Xinhua; Fan Tao; Xu Longya; Ge Qiongxuan; Energy Conversion Congress and Exposition (ECCE), 2010 IEEE; Digital Object Identifier: 10.1109/ECCE.2010.5617781 Publication Year: 2010 , pp. 3340-3344.*

(Continued)

*Primary Examiner* — Cuong H Nguyen
(74) *Attorney, Agent, or Firm* — Crowell & Moring LLP

(57) ABSTRACT

A method is provided for the early induction of an additional start of an internal combustion engine in a vehicle with a hybrid drive including at least one electric drive unit and one internal combustion engine. When only the electric drive is in operation, then the internal combustion engine is additionally started no later than when the determined requested nominal drive torque exceeds the maximum possible drive torque of the electric drive unit. In order to initiate an additional startup of the internal combustion engine before reaching or exceeding the maximum possible drive torque of the electric drive unit by way of the requested nominal drive torque, the still unfiltered driver request torque or a limited driver request torque is evaluated.

10 Claims, 2 Drawing Sheets

U.S. PATENT DOCUMENTS

| | | | |
|---|---|---|---|
| 6,634,247 B2 * | 10/2003 | Pels et al. | 74/329 |
| 7,234,435 B2 * | 6/2007 | Lewis et al. | 123/198 F |
| 7,392,871 B2 * | 7/2008 | Severinsky et al. | 180/65.28 |
| 7,455,134 B2 * | 11/2008 | Severinsky et al. | 180/65.28 |
| 7,520,353 B2 * | 4/2009 | Severinsky et al. | 180/65.28 |
| 7,559,388 B2 * | 7/2009 | Severinsky et al. | 180/65.28 |
| 7,565,939 B2 * | 7/2009 | Ando et al. | 180/65.28 |
| 7,578,364 B2 * | 8/2009 | Ohno | 180/65.28 |
| 7,743,747 B2 * | 6/2010 | Lewis et al. | 123/198 F |
| 8,037,955 B2 * | 10/2011 | Huber et al. | 180/65.28 |
| 2001/0020789 A1 * | 9/2001 | Nakashima | 290/40 C |
| 2002/0033059 A1 * | 3/2002 | Pels et al. | 74/329 |
| 2004/0000887 A1 | 1/2004 | Lim | |
| 2004/0233887 A1 * | 11/2004 | Meiling et al. | 370/349 |
| 2005/0101432 A1 * | 5/2005 | Pels et al. | 477/5 |
| 2006/0005802 A1 * | 1/2006 | Lewis et al. | 123/198 F |
| 2007/0208471 A1 * | 9/2007 | Lewis et al. | 701/36 |
| 2007/0233334 A1 * | 10/2007 | Kozarekar | 701/22 |
| 2009/0090572 A1 * | 4/2009 | Huber et al. | 180/65.28 |
| 2009/0125188 A1 * | 5/2009 | Broecker et al. | 701/42 |

FOREIGN PATENT DOCUMENTS

| | | | |
|---|---|---|---|
| DE | 103 18 882 A1 | | 11/2004 |
| DE | 10 2005 060 858 A1 | | 6/2007 |
| DE | 102005060858 A1 | * | 6/2007 |
| DE | 102007054017.7 | * | 11/2007 |
| EP | 1 862 364 A1 | | 12/2007 |
| EP | 1966021 A1 | * | 9/2008 |
| JP | 2000-062461 | * | 3/2000 |
| WO | WO 2007071464 A1 | * | 6/2007 |

OTHER PUBLICATIONS

A novel hybrid excitation flux switching synchronous machine for a high-speed hybrid electric vehicle applications; Sulaiman, E.; Kosaka, T.; Matsui, N.; Electrical Machines and Systems (ICEMS), 2011 International Conference on; Digital Object Identifier: 10.1109/ICEMS.2011.6073505; Publication Year: 2011 , pp. 1-6.*

Partial state feedback control of induction motors with magnetic saturation: elimination of #ux measurements; A. Behal, M. Feemster, D.M. Dawson, A. Mangal; Department of Electrical and Computer Engineering, 102 Riggs Hall, Clemson University, Clemson, SC 29634-0915, USA; revised Jul. 13, 2001.*

German Search Report dated Aug. 27, 2009 including partial English-language translation (Nine (9) pages).

International Search Report dated Apr. 19, 2010 including English-language translation (Six (6) pages).

* cited by examiner

METHOD FOR THE EARLY INDUCTION OF AN ADDITIONAL START OF AN INTERNAL COMBUSTION ENGINE IN A VEHICLE WITH A HYBRID DRIVE

CROSS-REFERENCE TO RELATED APPLICATIONS

This application is a continuation of PCT International Application No. PCT/EP2009/007487, filed Oct. 20, 2009, which claims priority under 35 U.S.C. §119 from German Patent Application No. DE 10 2008 056 972.0, filed Nov. 13, 2008, the entire disclosures of which are herein expressly incorporated by reference.

BACKGROUND AND SUMMARY OF THE INVENTION

The invention relates to a method for the early induction of an additional start of an internal combustion engine in a vehicle with a hybrid drive.

At the present time there already exist a wide variety of designs of vehicles with a hybrid drive for reducing emissions and fuel consumption. In these designs the hybrid drive consists of at least one electric drive unit and an internal combustion engine. In this case the determined nominal drive torque is split between the two drive units as a function of the current operating conditions of the vehicle so that the vehicle can be operated in a consumption optimized and/or emissions optimized operating mode.

Since in conventional actuation systems the electric drive unit can implement requested load changes significantly faster than an internal combustion engine, there already exist a plethora of methods for achieving just as fast an implementation of the torque requests given to internal combustion engines, in order to enhance the driving comfort. Hence, DE 10 2005 060 858 A1 discloses a method for operating a hybrid vehicle. According to this method, the unfiltered cumulative nominal torque is used as the basis for the division among the different drive units, so that the division yields a lead nominal torque for the slower path of an internal combustion engine. In this way higher driving dynamics are achieved. This method is designed especially for improving the dynamics when both drive units are in operation or at least the internal combustion engine is in operation. A strategy for the case, in which only the electric drive unit is in operation, is neither disclosed nor suggested.

When only the electric drive unit is in operation, the prior art does not generally activate the internal combustion engine until the nominal drive torque of the electric drive unit, or more specifically, the determined total nominal drive torque (since only the electric drive unit is active), exceeds the maximum possible available drive torque of the electric drive unit.

For a better understanding of the invention, the prior art method is shown in FIG. 1. According to the prior art, the torque requested by the driver Mdk_request is determined as a function of the position of the accelerator pedal sFP in that the position of the accelerator pedal influences the scaling specified by the maximum possible total torque of the drive train. That is, an interpretation of the accelerator pedal is performed. If the minimum total drive torque is, for example, −80 Nm, and the maximum total drive torque is 420 Nm, then a 20% actuation of the accelerator pedal is equivalent to a driver request torque Mdk_request of 100 Nm. However, the driver request torque Mdk_request cannot be set immediately for comfort reasons (for example, drive train vibrations). For this reason, the driver request torque Mdk_request runs through a driving dynamics filtering. At this point the driver request torque that is filtered with respect to the driving dynamics still has to run through torque coordination in order to be able to consider the external and internal requesters, that is, the external and internal requested torque limits (for example, operation under emergency conditions) and/or external torque intervention (for example, gear shifts, DSC intervention) when the nominal drive torque is specified. After the torque coordination the result is a (total) nominal drive torque Mdk_nominal, which is used within the framework of the torque splitting for splitting the nominal drive torque Mdk_nominal between the electric drive unit and the internal combustion engine.

When only the electric drive unit is in operation, the (total) nominal drive torque Mdk_nominal is demanded only of the electric drive unit. Not until the actuator unit of the electric drive unit detects that this electric drive unit cannot achieve and/or provide the requested nominal drive torque Mdk_nominal is an additional startup of the internal combustion engine requested. The result is a response loss, because initially the drive system lacks the necessary accelerating torque.

The object of the invention is to provide a method in which no unnecessary response losses occur when only the electric drive unit is in operation and an additional startup of the internal combustion engine is necessary.

This engineering object is achieved by a method for the early induction of an additional start of an internal combustion engine in a vehicle with a hybrid drive comprising at least one electric drive unit and one internal combustion engine, wherein when only the electric drive is in operation, then the internal combustion engine is additionally started no later than when the determined requested nominal drive torque exceeds the maximum possible drive torque of the electric drive unit. The requested nominal drive torque is determined as a function of the determined filtered driver request torque. In order to initiate an additional startup of the internal combustion engine before reaching or exceeding the maximum possible drive torque of the electric drive unit by means of the requested nominal drive torque, the still unfiltered driver request torque or a limited driver request torque is evaluated.

An aspect of the invention is to predict in real-time the (total) nominal drive torque or, more specifically, the nominal drive torque of the electric drive unit, so that an additional startup of the internal combustion engine can be initiated very early. In order to be able to predict the nominal drive torque of the electric drive unit or more specifically the (total) nominal drive torque, the determined driver request torque is already used and evaluated before consideration of all driving dynamics filters.

The inventive method for early induction of an additional start of an internal combustion engine in a vehicle with a hybrid drive including at least one electric drive unit and one internal combustion engine, provides, in principle, the internal combustion engine to be additionally started when the nominal drive torque, which is determined from the filtered driver request torque, reaches or exceeds the maximum possible drive torque of the electric drive unit at this time. In order to initiate the additional startup of the internal combustion engine already before reaching or exceeding the maximum possible drive torque of the electric drive unit, the still unfiltered driver request torque or a limited driver request torque is evaluated. By evaluating the unfiltered driver request torque an early prediction of the (total) nominal drive torque is possible and, in so doing, it is possible to quickly initiate measures for activating the internal combustion engine.

The maximum possible and/or available drive torque of the electric drive unit is specified at least as a function of the charge state of a battery unit, which supplies the electric drive unit with energy, and/or as a function of the operating temperature of the battery unit. In addition, it is also possible to consider other relevant parameters.

The determined unfiltered driver request torque is evaluated advantageously in such a way that this driver request torque or a driver request torque that is limited due to the presence of permanent torque limiters is compared with the maximum possible drive torque of the electric drive unit. If the unfiltered driver request torque or the limited driver request torque reaches or exceeds the maximum possible drive torque of the electric drive unit, then measures for an additional startup of the internal combustion engine are initiated.

In order to prevent the internal combustion engine from starting up too early, an advantageous embodiment of the invention provides that on reaching or exceeding the maximum possible drive torque of the electric drive unit by means of the determined driver request torque or the limited driver request torque, the measures for the additional startup of the internal combustion engine can be blocked or can be carried out only after a time delay. In particular, the measures can be blocked or carried out with a time delay, when the conditions for blocking or delaying are present or rather are fulfilled. The conditions for blocking or delaying may be met, for example, when, based on the current operating conditions, the external and/or internal power requesters request that the driver request torque be limited for at least a specified period of time.

Other objects, advantages and novel features of the present invention will become apparent from the following detailed description of one or more preferred embodiments when considered in conjunction with the accompanying drawings.

DETAILED DESCRIPTION OF THE DRAWINGS

Since FIG. 1 was already explained above, only the schematic drawing from FIG. 2 is explained in detail below.

Figure 1:
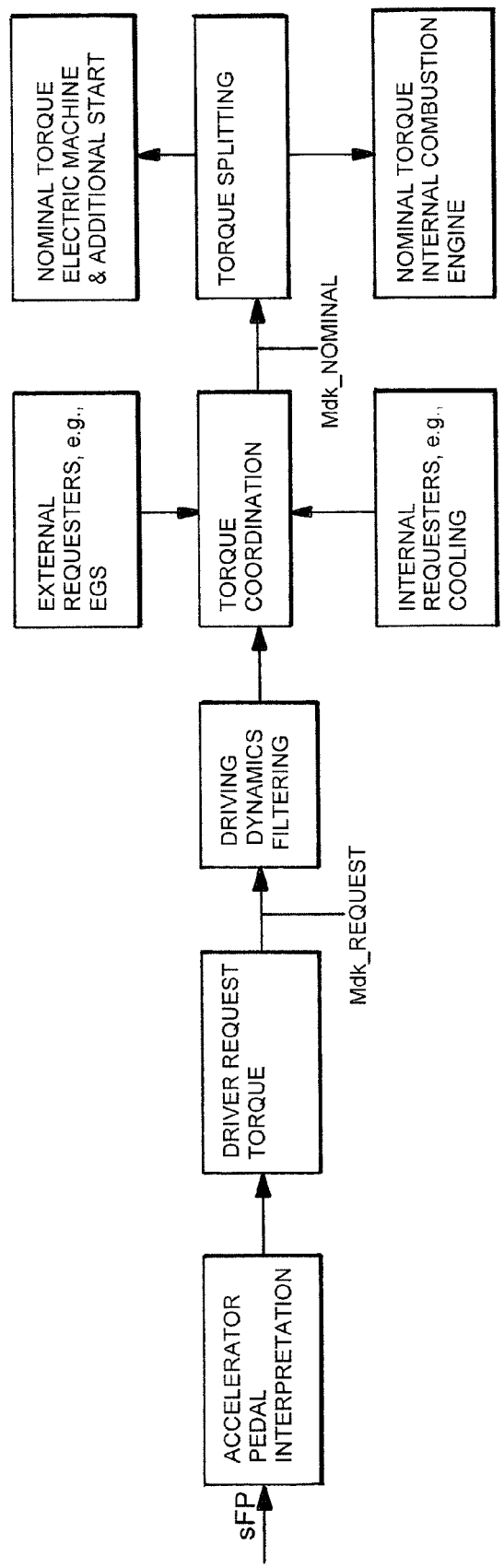
FIG. 1 is a schematic drawing of the prior art for determining when an additional startup of the internal combustion engine has to be initiated.
Figure 2:
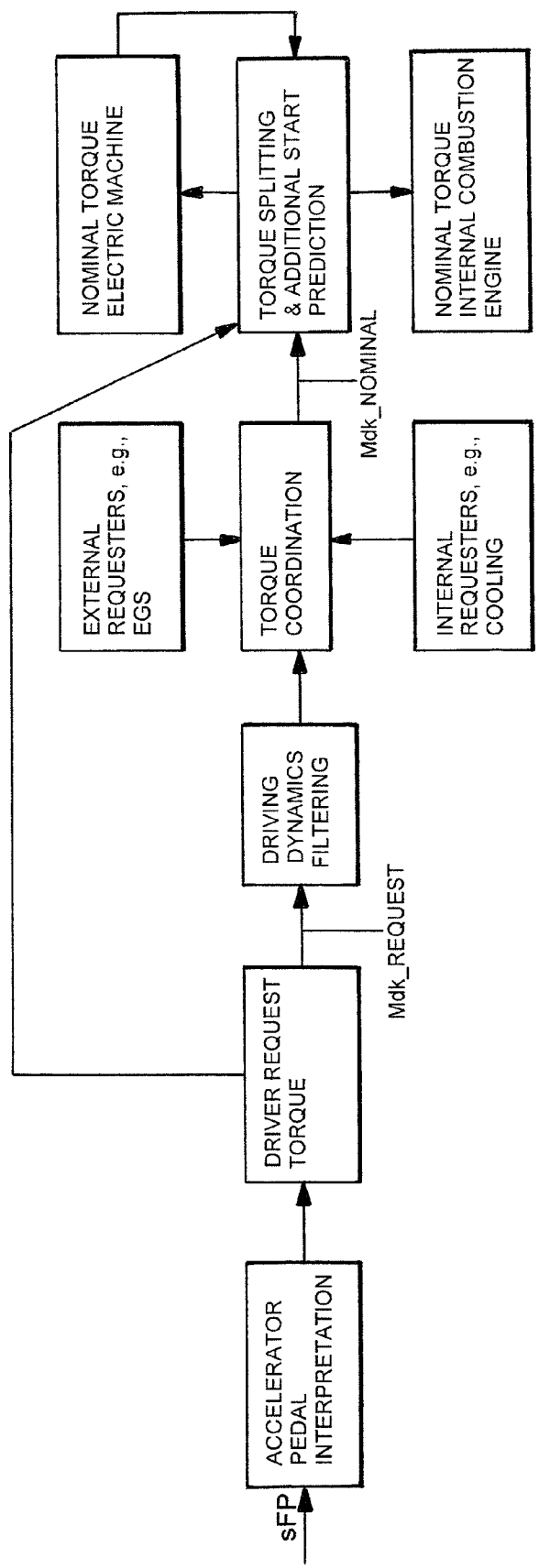
FIG. 2 is a schematic drawing for determining an early additional startup of the internal combustion engine according to a preferred embodiment of the invention.

In a manner analogous to FIG. 1, the driver request torque Mdk_request is determined as a function of the accelerator pedal position sFP and a subsequent accelerator pedal interpretation.

Then, the determined driver request torque Mdk_request runs through a driving dynamics filtering and, in a next step, a torque coordination in order to be able to consider the external and internal requests in the course of determining the nominal drive torque Mdk_nominal.

After the torque coordination, the determined nominal drive torque Mdk_nominal is fed to a torque splitting, in order to split the nominal drive torque between the electric drive unit and the internal combustion engine. This example assumes that at this point in time only the electric drive unit is active, and, thus, the total nominal drive torque is demanded of the electric drive unit.

The invention provides that, within the framework of the torque splitting, not only the determined nominal drive torque Mdk_nominal but also the unfiltered driver request torque Mdk_request (or as an alternative a driver request torque that is limited due to the permanent torque limiters) is evaluated, especially with respect to an additional start prediction of the internal combustion engine. Since this unfiltered driver request torque Mdk_request (or the limited driver request torque) is already available significantly earlier than the nominal drive torque Mdk_nominal that runs through the driving dynamics filtering and the torque coordination, then it is already possible to predict a necessary additional startup of the internal combustion engine and to initiate appropriate measures, if the determined nominal drive torque Mdk_nominal has not yet reached or exceeded the maximum possible drive torque of the electric drive unit. This prediction of the nominal drive torque from the unfiltered driver request torque makes it possible to initiate an additional startup of the internal combustion engine already before the maximum torque limit of the electric drive unit is reached. This strategy produces a continuous drive torque characteristic and, associated with this, an enhancement in the driving comfort for the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for early induction of an additional starting of an internal combustion engine of a vehicle having a hybrid drive including at least one electric drive unit and the internal combustion engine, the method comprising the acts of:

when only the electric drive is in operation, additionally starting the internal combustion engine no later than when a determined requested nominal drive torque exceeds a maximum possible drive torque of the electric drive unit, the requested nominal drive torque being determined as a function of a determined filtered driver request torque; and evaluating a still unfiltered driver request torque or a limited driver request torque for the early induction of the additional starting of the internal combustion engine even if the determined requested nominal drive torque has not reached or exceeded the maximum possible drive torque of the electric drive unit.

2. The method according to claim 1, wherein the maximum possible drive torque of the electric drive unit is specified as at least one of:

a function of the charge state of a battery unit, which supplies the electric drive; and a function of the operating temperature of a battery unit that supplies the electric drive.

3. The method according to claim 1, wherein the determined unfiltered driver request torque or the limited driver request torque is compared with the maximum possible drive torque of the electric drive unit, and on reaching or exceeding the maximum possible drive torque of the electric drive unit, measures for an additional startup of the internal combustion engine are initiated.

4. The method according to claim 2, wherein the determined unfiltered driver request torque or the limited driver request torque is compared with the maximum possible drive torque of the electric drive unit, and on reaching or exceeding the maximum possible drive torque of the electric drive unit, measures for an additional startup of the internal combustion engine are initiated.

5. The method according to claim 1, wherein on reaching or exceeding the maximum possible drive torque of the electric drive unit by way of the determined filtered driver request torque, the measures for the additional startup of the internal combustion engine are blocked or carried out time delayed, when the conditions for blocking or delaying are met.

6. The method according to claim 2, wherein on reaching or exceeding the maximum possible drive torque of the electric drive unit by way of the determined filtered driver request torque, the measures for the additional startup of the internal combustion engine are blocked or carried out time delayed, when the conditions for blocking or delaying are met.

7. The method according to claim 4, wherein on reaching or exceeding the maximum possible drive torque of the electric drive unit by way of the determined filtered driver request torque, the measures for the additional startup of the internal combustion engine are blocked or carried out time delayed, when the conditions for blocking or delaying are met.

8. The method according to claim 5, wherein the conditions for blocking or delaying are met, when based on the current operating conditions, the external and/or internal power requesters request that the driver request torque be limited for at least a specified period of time.

9. The method according to claim 6, wherein the conditions for blocking or delaying are met, when based on the current operating conditions, the external and/or internal power requesters request that the driver request torque be limited for at least a specified period of time.

10. The method according to claim 6, wherein the conditions for blocking or delaying are met, when based on the current operating conditions, the external and/or internal power requesters request that the driver request torque be limited for at least a specified period of time.

* * * * *